United States Patent
Zhang et al.

(10) Patent No.: US 10,230,769 B2
(45) Date of Patent: Mar. 12, 2019

(54) METHOD AND SWITCH FOR LAWFUL INTERCEPTION

(71) Applicant: Telefonaktiebolaget L M Ericsson (publ), Stockholm (SE)

(72) Inventors: Jiangtao Zhang, San Jose, CA (US); Bengt Johansson, Västra Frölunda (SE); Lasse Olsson, Stora Höga (SE); Sten Pettersson, Torslanda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 464 days.

(21) Appl. No.: 14/785,221

(22) PCT Filed: Apr. 19, 2013

(86) PCT No.: PCT/CN2013/074399
§ 371 (c)(1),
(2) Date: Oct. 16, 2015

(87) PCT Pub. No.: WO2014/169470
PCT Pub. Date: Oct. 23, 2014

(65) Prior Publication Data
US 2016/0072850 A1    Mar. 10, 2016

(51) Int. Cl.
*H04L 29/06* (2006.01)
*H04W 12/02* (2009.01)

(52) U.S. Cl.
CPC .......... *H04L 63/30* (2013.01); *H04L 63/0254* (2013.01); *H04L 63/0281* (2013.01); *H04L 63/306* (2013.01); *H04W 12/02* (2013.01)

(58) Field of Classification Search
CPC . H04L 63/30; H04L 63/0281; H04L 63/0254; H04L 63/306; H04W 12/02
See application file for complete search history.

(56) References Cited

U.S. PATENT DOCUMENTS

| | | | |
|---|---|---|---|
| 7,586,899 B1* | 9/2009 | Mohaban | H04L 29/06027 370/352 |
| 2002/0150096 A1* | 10/2002 | Sjoblom | H04L 63/0428 370/389 |

(Continued)

FOREIGN PATENT DOCUMENTS

| | | |
|---|---|---|
| CN | 1338169 A | 2/2002 |
| CN | 101159625 A | 4/2008 |

(Continued)

OTHER PUBLICATIONS

ETSI, TS 102 657 v1.71. Oct. 2010, Technical Specification: Lawful Interception (LI); Retained data handling; Handover interface for the request and delivery of retained data, pp. 1-109.*

(Continued)

*Primary Examiner* — Robert B Leung
*Assistant Examiner* — Thomas Ho
(74) *Attorney, Agent, or Firm* — Rothwell, Figg, Ernst & Manbeck, p.c.

(57) ABSTRACT

The present disclosure relates to methods and devices, of activating lawful interception. According to the present disclosure, a gateway comprises a controller for controlling, using a flow control protocol, the flow of packets through a switch controlled by the gateway. The switch receives (S11), from the controller, a lawful interception activation request, comprising a target identity; activates (S12), in response to said request, lawful interception on a target identified by the target identity; duplicates (S13), in the switch, packets targeting the target; encapsulates (S14) the duplicated packets with an additional header; and forwards (S15) duplicates from the switch directly to the lawful interception service provider entity (1) for further distribution to a Lawful interception Agency.

23 Claims, 12 Drawing Sheets

(56) References Cited

U.S. PATENT DOCUMENTS

| | | | |
|---|---|---|---|
| 2008/0198993 A1* | 8/2008 | Imbimbo | H04L 43/00 379/213.01 |
| 2009/0234845 A1* | 9/2009 | DeSantis | H04L 43/026 |
| 2011/0314177 A1 | 12/2011 | Harp | |
| 2012/0039213 A1* | 2/2012 | Cheng | H04W 76/022 370/254 |
| 2013/0057388 A1* | 3/2013 | Attanasio | G06Q 50/26 340/10.1 |
| 2013/0288652 A1* | 10/2013 | Ciriaco | G10L 15/00 455/414.1 |
| 2014/0029427 A1* | 1/2014 | Huici | H04L 47/623 370/235 |

FOREIGN PATENT DOCUMENTS

| | | |
|---|---|---|
| CN | 101222500 A | 7/2008 |
| CN | 2013/074399 A | 9/2008 |
| WO | 2010009766 A1 | 1/2010 |
| WO | 2012/160465 A1 | 11/2012 |

OTHER PUBLICATIONS

International Search Report and Written Opinion issued in corresponding International Application No. PCT/CN2013/074399, dated Jan. 23, 2014, 10 pages.

"3rd Generation Partnership Project; Technical Specification Group Services and System Aspects; 3G security; Lawful Interception requirements (Release 12)", 3GPP TS 33.106 V12.0.0, Mar. 2013, 17 pages.

"3rd Generation Partnership Project; Technical Specification Group Services and System Aspects; 3G security; Lawful interception architecture and functions (Release 12)", 3GPP TS 33.107 V12.2.0, Mar. 2013, 147 pages.

"3rd Generation Partnership Project; Technical Specification Group Services and System Aspects; 3G security; Handover interface for Lawful Interception (LI) (Release 12)", 3GPP TS33.108 V12.0.0, Mar. 2013, 194 pages.

Supplementary European Search Report issued in Application No. EP13882382.8 dated Nov. 16, 2016, 6 pages.

* cited by examiner

METHOD AND SWITCH FOR LAWFUL INTERCEPTION

CROSS REFERENCE TO RELATED APPLICATION(S)

This application is a 35 U.S.C. § 371 National Phase Entry Application from PCT/CN2013/074399, filed Apr. 19, 2013, designating the United States, the disclosure of which is incorporated herein in its entirety by reference.

TECHNICAL FIELD

The present disclosure relates to the field of lawful interception and to a method, node and switch for providing lawful interception. In particular the present disclosure relates to enabling lawful interception in an Evolved Packet Core, EPC, network, using an Openflow enabled switch.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs.

The Evolved Packet Core, EPC, is the core network of the LTE system and is an evolution of the packet-switched architecture used in GPRS/UMTS. The separated sub-domains of previous mobile generations of circuit-switching for voice and packet-switching for data is now realized in the EPC as packet switched architecture only. The main components of the EPC are the Serving Gateway, SGW, the Packet Data Network, PDN, Gateway, PGW, and the Mobility Management Entity, MME.

In many countries operators and Internet service providers are today obliged by legal requirements to provide stored traffic data generated from public telecommunications and Internet services for the purpose of detection, investigation and prosecution of crime and criminal offences, including terrorism.

Usually a public official, for instance a judge, is in charge of authorizing investigation on target persons, allowing to activate lawful interception, LI, on their communications or to query on data retention databases. The authorization paper is conventionally referred to as a "warrant", which is provided to law enforcement agencies, LEA.

According to a received warrant, the law enforcement agency may set targets of interception and/or query data retention databases.

Existing payload handling methods in an EPC network are neither flexible nor performance oriented. When the payload increases with increased usage of the network, the processing board (for example the PGW) can be overloaded, but it is not flexible to scale. That is because of the limited capacity of the processing board; incoming and outgoing packets make use of I/O resources, computing resources and memory resources so that with increased payload, the processing board resources will eventually be overloaded. This is a limitation of the current EPC network node. Especially when LI is requested, performance gets even worse because of the increasing payload over the network, when the packets to be intercepted are duplicated and the duplicates are sent to the LEA.

SUMMARY

This disclosure provides improved methods and devices for providing lawful interception in an EPC network. According to the disclosure one method in a gateway and one method in a switch are provided for improved handling of lawful interception in a network. Furthermore, a gateway and a switch for implementing the methods are provided.

With the above description in mind, then, an aspect of the present disclosure is to provide methods for improving handling of lawful interception, which seeks to mitigate, alleviate, or eliminate one or more of the above-identified deficiencies in the art and disadvantages singly or in any combination.

The present disclosure is defined by the appended independent claims. Various advantageous embodiments of the disclosure are set forth by the appended dependent claims as well as by the following description and the accompanying drawings.

According to one aspect of the disclosure, it provides for a method, executed in a gateway, of activating lawful interception. The gateway comprises a controller for controlling, using a flow control protocol, the flow of packets through a switch controlled by the gateway. The method comprises the steps of: receiving, from a lawful interception service provider entity, an instruction on lawful interception activation, comprising a target identity; sending to the switch, from the controller, a lawful interception activation request, comprising the target identity; thereby instructing a switch to duplicate packets being addressed to the target and forward the duplicates to the lawful interception service provider entity; and offloading at least all packets targeting said target, by redirecting them to the switch and sending an acknowledge to the lawful interception service provider entity.

By using a controller in the gateway which instructs a switch to duplicate packets and to forward those to the lawful interception service provider entity, the gateway is offloaded from handling the packets to be lawfully intercepted.

According to one aspect of the disclosure the lawful interception service provider entity comprises an administration function ADMF, a delivery function two DF2 and a delivery function three DF3.

According to one aspect of the disclosure the method further comprises the step of: the gateway sending interception related information to delivery function two DF2.

According to one aspect of the disclosure the lawful interception activation request further comprises the delivery function three port number and IP address so that the switch can send the duplicated packets directly to DF3.

According to one aspect of the disclosure the flow control protocol is openflow. By using the openflow protocol, an existing and well functioning protocol is used to offload the gateway when lawful interception is requested.

According to one aspect of the disclosure the lawful interception activation request comprises a flow table modification request. When using the openflow protocol, changes in the switch of how to handle packets are flow table modifications.

According to one aspect of the disclosure the gateway is located in a core network in a cellular communication system.

According to one aspect of the disclosure, it provides for a method, in a switch, of providing lawful interception. The switch is controlled by a controller for controlling the flow of packets through said switch using a flow control protocol.

The method comprises the steps of: receiving, from the controller, a lawful interception activation request, comprising a target identity; activating, in response to said request, lawful interception on a target identified by the target identity; duplicating, in the switch, packets targeting the target; encapsulating the duplicated packets with an additional header; and forwarding duplicates from the switch directly to the lawful interception service provider entity for further distribution to a Lawful interception Agency.

By using the switch for duplicating packets and sending them directly from the switch to the lawful interception service provider entity the gateway is offloaded from handling the packets to be lawfully intercepted. Thus, improved methods for handling LI in a network are provided. A standard switch, for example an Ethernet switch is used to build a flexible LI architecture. By using a standard switch, the handling of LI is scalable and agile. Using the methods in a telecom node architecture does not affect the architecture and functionality of the telecom node since it is an addition which does not interfere with the telecom nodes original setup. It is possible to deploy the present disclosure in a cloud computing environment.

According to one aspect of the disclosure the flow control protocol is extended to comprise lawful interception information.

According to one aspect of the disclosure the lawful interception service provider entity comprises an administration function ADMF, a delivery function two DF2 and a delivery function three DF3, and wherein the duplicated packets are forwarded to delivery function three.

According to one aspect of the disclosure the additional header comprises the delivery function three port number and IP address. By providing the DF3 port number in the header, the switch can send the duplicated packets directly to DF3 in the lawful interception service provider entity.

According to one aspect of the disclosure the lawful interception activation request further comprises the delivery function three port number and IP address.

According to one aspect of the disclosure the flow control protocol further comprises a message indicating that the node supports lawful interception. That is so that all devices using the flow control protocol will expect lawful interception related information in the packets sent between the devices.

According to one aspect of the disclosure the switch is an openflow switch and the flow control protocol is openflow. By using an openflow switch, an existing and well functioning protocol is used to offload the gateway when lawful interception is requested. Thus the methods of the present disclosure provides for a way to combine GTP-U offloading and LI.

According to one aspect of the disclosure the lawful interception activation request comprises a flow table modification request on the targeted port.

According to one aspect of the disclosure the switch is located in a core network in a cellular communication system.

According to one aspect of the disclosure the switch is located in connection with a gateway in the core network and wherein the switch is used to offload the forwarding function in the gateway.

According to one aspect of the disclosure the gateway is a Serving Gateway, SGW, a Packet Data Network Gateway, PGW, a Serving GPRS Support Node, SGSN, a Gateway GPRS Support Node, GGSN, a Packet Data Serving Node, PDSN or a Broadband Remote Access Server, BRAS.

According to one aspect of the disclosure, it provides for a switch, implemented using a flow control protocol for controlling the forwarding of packets through said switch by a controller. The switch comprises: a receiver, arranged to receive, from the controller a lawful interception activation request, comprising a target identity; an activator, arranged to activate, in response to said request, lawful interception on a target identified by the target identity; a duplicator, arranged to duplicate packets targeting the target; an encapsulator, arranged to encapsulate the duplicated packets with an additional header; and a transmitter, arranged to forward duplicated packets from the switch directly to the lawful interception service provider entity for further distribution to a Lawful interception Agency.

According to one aspect of the disclosure, it provides for a gateway, configured to control, using a flow control protocol, the forwarding of packets through a switch. The gateway comprises: a network communication unit; a processor; and a memory storing computer program code. The computer program code, when run in the processor, causes the gateway to: receive, using the network communication, from a lawful interception service provider entity, an instruction on lawful interception activation, comprising a target identity; send to the switch using the network communication, a lawful interception activation request of the flow control protocol, comprising the target identity; thereby instructing a switch to duplicate packets being addressed to the target and forward the duplicates to the lawful interception service provider entity; offload at least all packets targeting said target, by redirecting them to the switch and send, using the network communication, an acknowledge to the lawful interception service provider entity.

According to one aspect of the disclosure, it provides for a computer program, comprising computer readable code which, when run on a node, causes the node to perform the method according to above.

With the above description in mind, the object of the present disclosure is to overcome at least some of the disadvantages of known technology as previously described.

BRIEF DESCRIPTION OF THE DRAWINGS

The present technique will be more readily understood through the study of the following detailed description of the embodiments/aspects together with the accompanying drawings, of which.

It should be added that the following description of the embodiments is for illustration purposes only and should not be interpreted as limiting the disclosure exclusively to these embodiments/aspects.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

Embodiments of the present disclosure relate, in general, to the field of handling lawful interception, LI, in an EPC network. However, it should be appreciated that the principle in general is applicable in any network where lawful interception is requested.

The core idea of the presented technique is to improve handling of LI in an EPC network by offloading or redirecting intercepted traffic from a gateway to a switch so that the LI is handled directly in the switch. Thereby the actions required for lawful interception, such as copying of packets, is executed in the switch so that the performance of the gateway will be less affected by the lawful interception.

Lawful interception will now be introduced in order to fully explain the principle of the presented technique.

Figure 1A:
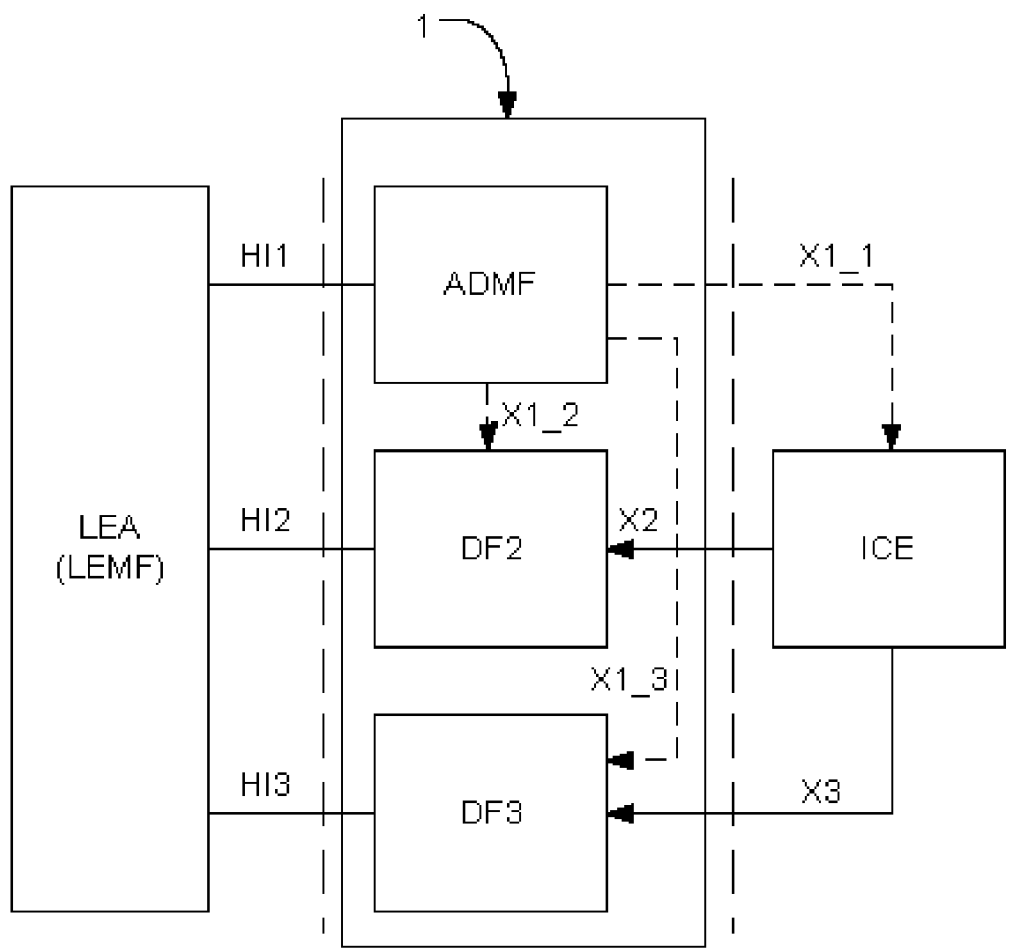
FIG. 1a illustrates a setup for providing lawful interception according to prior art.

FIG. 1a is an illustration of a conventional setup for providing lawful interception in a network, according to the 3GPP specification TS 33.107. FIG. 1a discloses a Law Enforcement Agency, LEA, a LI service provider entity 1 and Interception Control Elements, ICE.

The LEA is the agency from which the order comes to activate LI on a specific target for the purpose of obtaining data for analysis or for evidence. The agency ordering lawful interception on a target may also be a regulatory or administrative agency and intelligence services in accordance to local law.

The LI service provider entity 1 is a collection of functions for mediating between a network and the LEA when LI has been requested. The LI service provider entity comprises an ADMF, DF2 and DF3 according to the LI standards 3GPP doc TS 33.107.

The ICE are the elements of the network which handles the LI of the target specified by the LEA. One or more of Serving GPRS Support Node, Serving Gateway and/or Packet Data Network Gateway may be defined as ICE in order to intercept signaling and content of communication for a mobile node, or a user entity, that is a target for Lawful Interception.

In this setup, an Administration Function ADMF entity in a lawful interception service provider entity 1 is configured to send target identity and Lawful Interception authorization data received from the respective Law Enforcement Agencies LEA via a Law Enforcement Monitoring Facility LEMF to ICE in a communications network.

The Administration Function communicates through a first Handover Interface HI1 with all the Law Enforcement Agencies and keeps the intercept activities of individual Law Enforcement Agencies separate. The Administration Function may also be used to hide from Intercepting Control Elements that multiple activations by different Law Enforcement Agencies on the same target are active. Moreover, the Administration Function may be partitioned to ensure separation of provisioning data from different agencies.

Every physical Intercepting Control Element is linked to the Administration Function by means of its own X1_1 interface. Consequently, every Intercepting Control Element may perform interception, i.e. activation, deactivation, interrogation as well as invocation independently from other Intercepting Control Elements.

In order to deliver the intercepted information to the Law Enforcement Agencies, two Delivery Function (DF) entities are provided. The Delivery Function entities receives information from the Administration Function through the X1_2 and X1_3 interfaces respectively, as well as delivers information to the Law Enforcement Monitoring Facility through interfaces HI2 and HI3, respectively.

In particular, the Delivery Function two DF2 entity is configured to receive Intercept Related Information, IRI, from Intercepting Control Element through an X2 interface and to convert and distribute the Intercept Related Information to the relevant Law Enforcement Agency via the second Handover Interface HI2.

The Intercept Related Information is a collection of information or data associated with telecommunication services involving the target identity, such as call associated information or data, e.g. unsuccessful call attempts, service associated information or data, e.g. service profile management by subscriber, and location information.

A Delivery Function three DF3 entity is configured to receive Content of Communications, CC, information from the Intercepting Control Elements through an X3 interface, and to convert and distribute that information to the relevant Law Enforcement Agency via the third Handover Interface HI3.

To conclude the functions of the Handover Interfaces: HI1 is used to provision and administrate lawful interception functionality, HI2 is used to transfer IRI to the LEMF and HI3 is used to transfer CC to the LEMF.

The Content of Communications, which is information different from the Intercept Related Information, is exchanged between two or more users of a telecommunications service and, more in general, includes information which, as part of some telecommunications service, could be stored by one user for subsequent retrieval by another user.

Figure 1B:
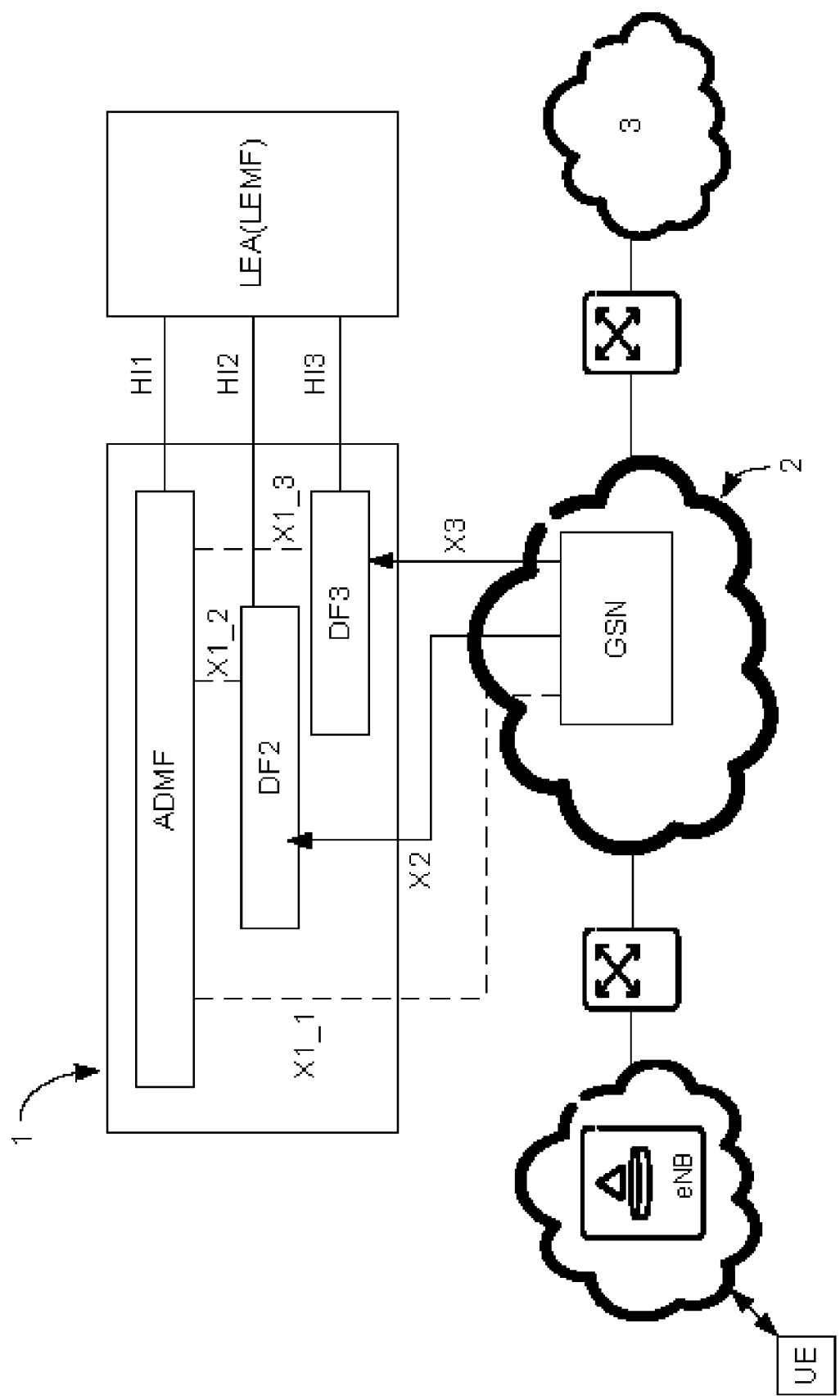
FIG. 1b illustrates a setup for providing lawful interception with a more detailed illustration of the network according to prior art.

FIG. 1b is an illustration of a setup for providing lawful interception with a more detailed illustration of how Lawful interception is integrated in an LTE network. A GPRS support node GSN in the EPC network 2 handles the communications with the LI service provider entity 1. When a user entity UE is targeted for LI, the data that the user entity sends through the evolved node B, eNB, and the EPC network 2 to, for example, the Internet 3 is intercepted in the GSN in the EPC for LI. The GSN is connected to the LI service provider entity via several interfaces. The GSN is informed about which targets to perform LI on via the X1_1 interface. X2 and X3 have been described above.

The Lawful Interception system comprises one or more Law Enforcement Monitoring Facilities LEMFs, through which respective Law Enforcement Agencies LEAs may receive interception information via the lawful interception service provider entity 1.

The disclosure is based on using a flow control protocol. The Openflow protocol will now be introduced in order to fully explain the principle of the presented technique.

Figure 2A:
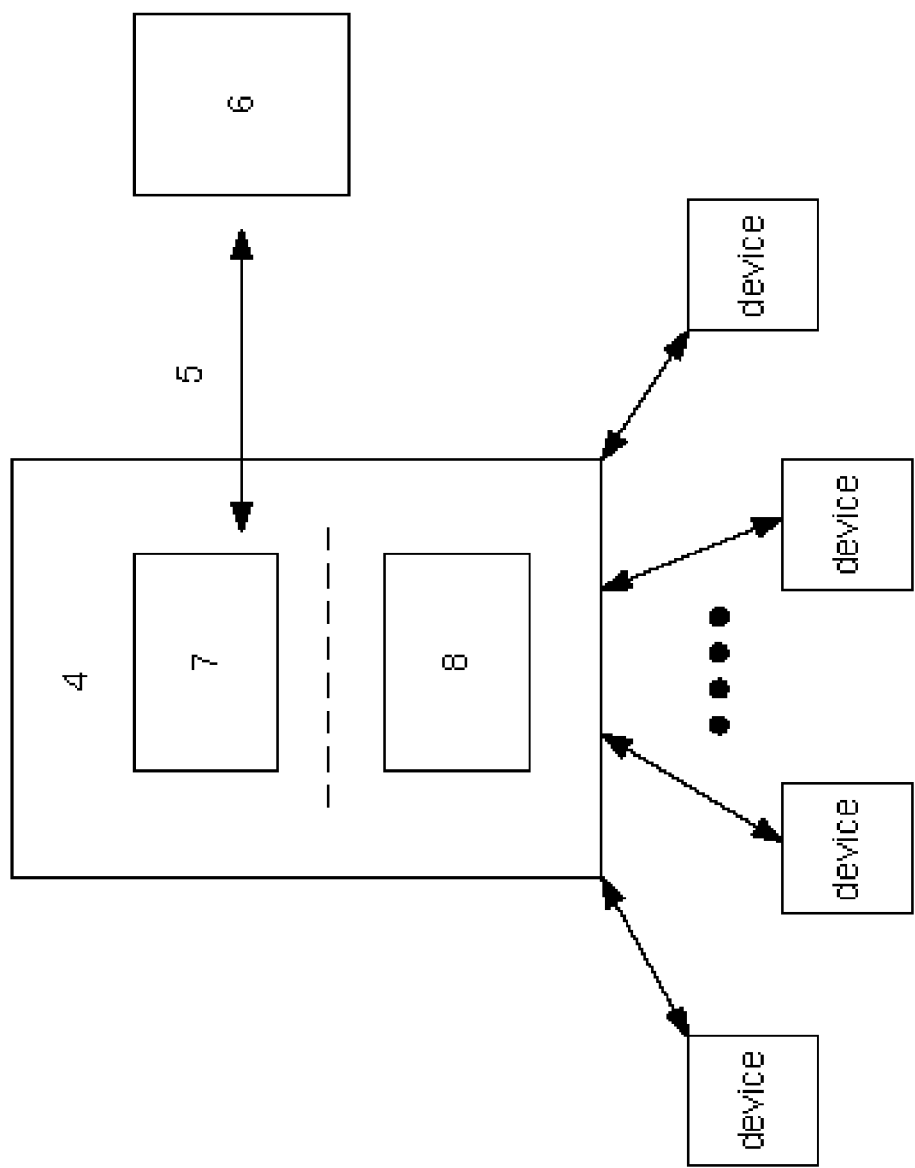
FIG. 2a illustrates a setup for using an openflow enabled switch according to prior art.

FIG. 2*a* illustrates an example of a conventional setup for using an openflow enabled switch 4; see Openflow Switch Specification Version 1.1.0. An openflow switch is a network switch conforming to the openflow specification. The openflow protocol 5 enables a controller 6 to connect to an openflow enabled switch using a secure channel 7 and to control a flow table 8 in the switch by sending flow table modifications to the switch.

The controller 6 is an external software component executed by a remote computing device that enables a user to configure the openflow switch 4 through a standardized interface to add, modify and remove flow entries. The secure channel 7 can be provided by any type of network including a local area network, LAN, or a wide area network, WAN, such as the Internet. When a flow entry is matched in the flow table 8, an associated action set will be performed on the matched packets. The separate tunnels are identified by a Tunnel Endpoint Identifier, TEID in the GTP-U messages. The flow entry in the flow table is identified by TEID together with GTP-U IP address and User Datagram Protocol, UDP, port number. When the GTP-U flow entry is matched, that means a tunnel bearer is identified, and a set of actions will be performed on it.

A flow is, for example, a TCP connection, all packets from a particular MAC address or IP address, all packets with the same VLAN tag, all packets from the same switch port or all packets in one GTP-U tunnel bearer, which is the case of the present disclosure.

The proposed technique will now be introduced referring to FIGS. 3*a*-3*d*. The proposed technique builds on the idea to use an offloading solution, where intercepted traffic is offloaded from a gateway in core network. Offloading is typically implemented by placing a switch 4 in connection with the gateways in a core network, and redirecting packets directly through the switch, whereby the gateways are offloaded. Gateway offloading is not a new concept; GPRS Tunneling Protocol User data, GTP-U, offloading has previously been proposed e.g. in patent publication WO2012160465.

Figure 3A:
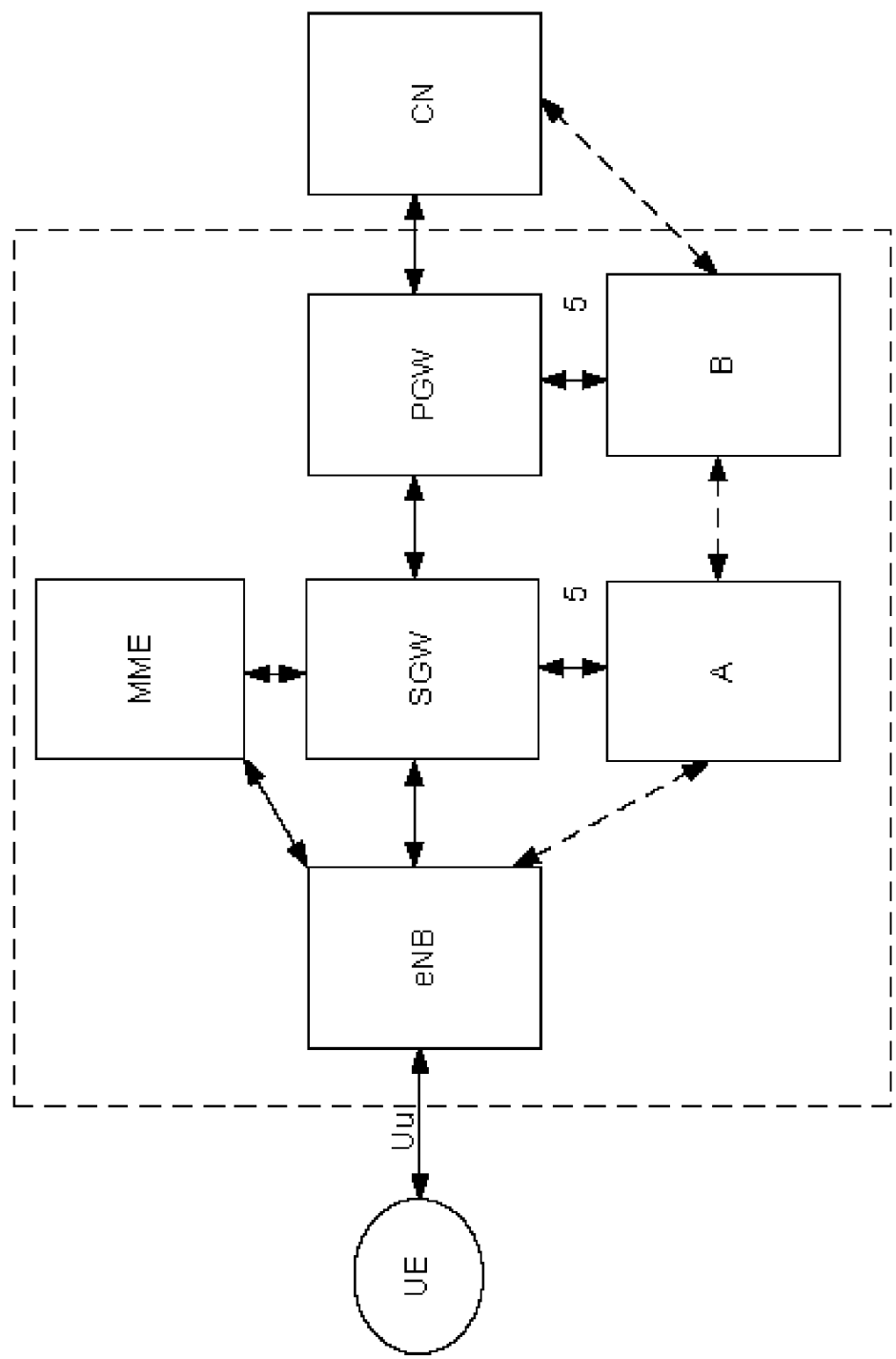
FIG. 3a is a flow chart for offloading the SGW and the PGW.
Figure 3B:
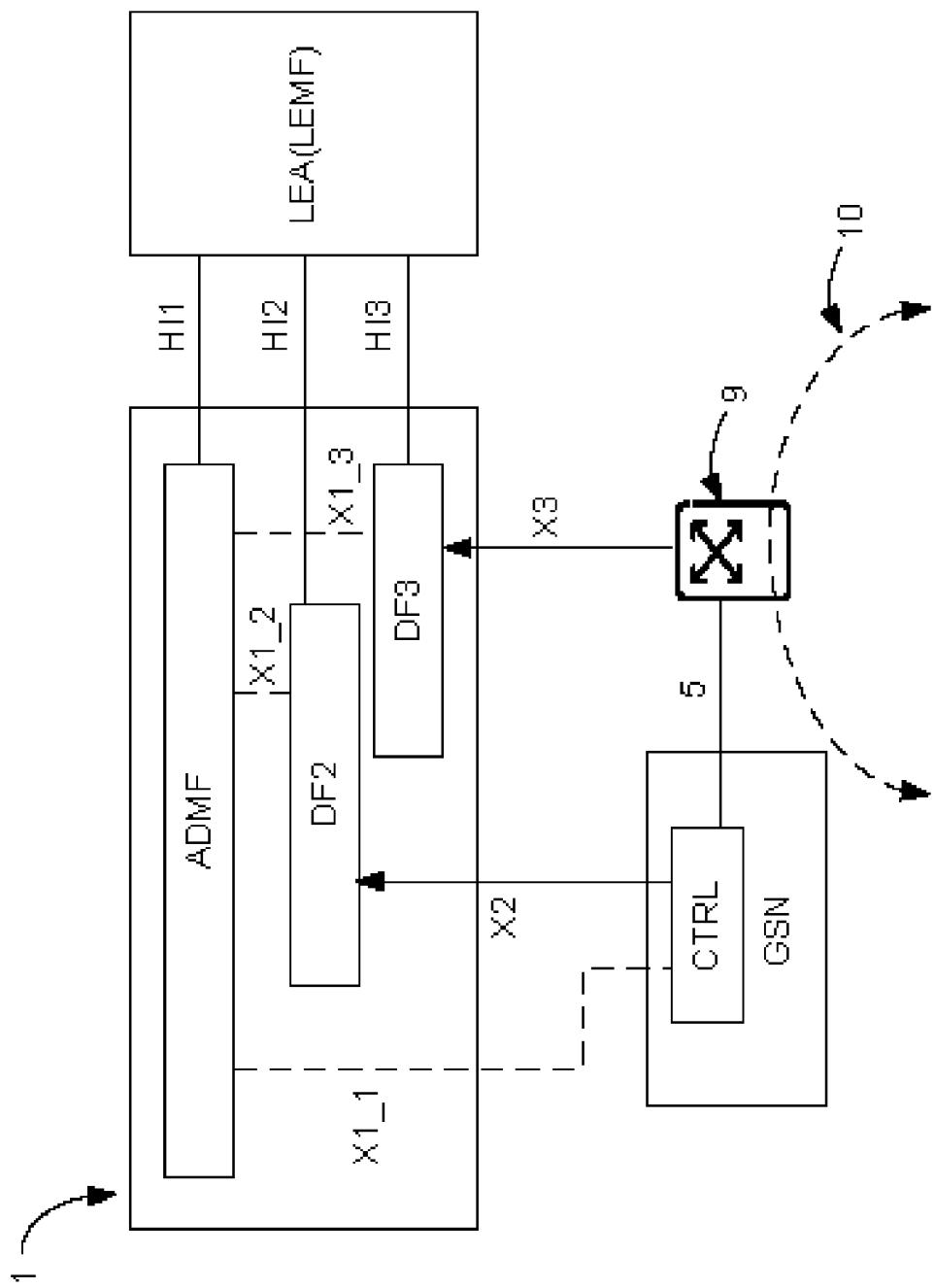
FIG. 3b illustrates a setup for providing lawful interception according to an exemplary embodiment of the present disclosure.
Figure 3C:
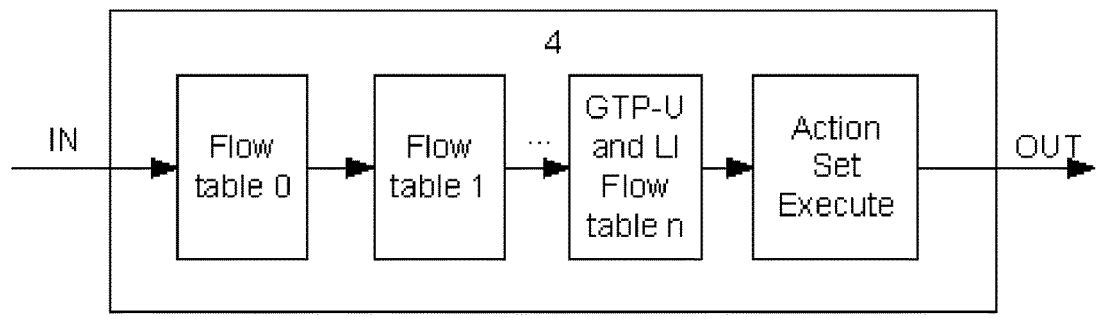
FIG. 3c illustrates the extension to the openflow protocol in an openflow switch according to an exemplary embodiment of the present disclosure.
Figure 3D:
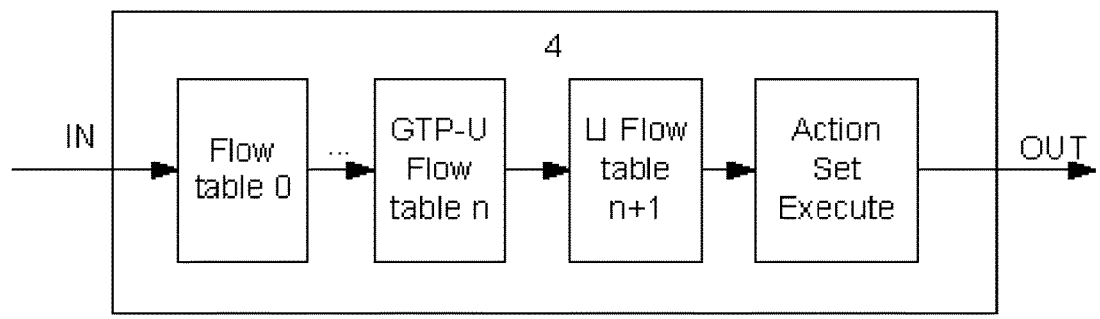
FIG. 3d illustrates the extension to the openflow protocol in an openflow switch according to a further exemplary embodiment of the present disclosure.

FIG. 3*a* illustrates GTP-U offloading, in order to facilitate understanding of the proposed technique, which will follow in FIGS. 3*b-d*. GTP-U is used for transfer of user data in separated tunnels for each packet data protocol, PDP, context. In the figure a user entity UE communicates with a core network CN through an Evolved Packet System EPS. The EPS includes an evolved Node B eNB, a mobility management entity MME, a Serving Gateway SGW, a PDN Gateway PGW and two openflow enabled switches 4 (A and B). The node eNB encapsulates and sends GTP-U packets to switch A. If there is no flow table item in the switch at the moment which handles the packet, the packet is sent to a controller in the SGW for a session management procedure. A session management procedure involves performing a session request procedure from the MME to the SGW, or to create a bearer procedure from the PGW to the SGW, for setting up the bearer on the SGW. The controller will consequently load the GTP-U flow table to switch A via the openflow protocol 5. The subsequent GTP-U packets from the node are then offloaded from the SGW by switch A and sent directly to switch B. In switch B, the procedure is the same as the previously discussed for switch A; when a session management procedure is done on a packet, Switch B offloads packets from the PGW and send them directly to the CN. The forwarding function of the SGW and the PGW has thus been moved to the switch.

In other words, when there is no matching flow table 8 for an incoming GTP-U payload, the openflow switches 4 will forward the packets to the corresponding controller and the controller then loads the desired forwarding rules for the GTP-U payload to the openflow switch. When the controller has finished the session management procedure, a bearer or PDP (packet data protocol) tunnel is established. GTP-U payload forwarding rules are downloaded to Openflow switch continuously.

Echo requests, Echo responses and Error indications, which does not belong to specific bearers, will be regarded as signaling and sent to the Openflow controller. Echo request/response is used to keep the tunnel alive between the GSN nodes and Error indications are used to indicate if the sending node does not have a corresponding bearer.

There are two ways to populate the flow tables, active and passive. The active way implies that when the EPC network nodes have finished the session management procedure, a bearer or PDP tunnel has been established and the GTP-U payload forwarding rules are downloaded to the switch actively. In the passive way, if there is an incoming GTP-U payload but no matching flow table in the switch, the packets will be forwarded to the controller and the EPC network nodes will find the contexts of this bearer and download the forwarding flow table rules to the switch.

FIG. 3*b* illustrates the implementation of lawful interception in a GPRS support node (GSN) according to an exemplary embodiment of the present disclosure. In this implementation, a LI enabled switch 9 is placed in connection with the GPRS support node (GSN). Furthermore, the GSN is provided with a controller CTRL, for controlling the switch, typically using openflow.

The controller receives LI instructions from the LI service provider entity 1 via the X1_1 interface and provides instructions to the switch 9 about which packets the switch should intercept. The controller also instructs the switch of which packets it should handle, i.e. offload 10 from the GSN. In other words, the controller is connected to the LI service provider entity and to the switch. The controller also sends interception related information to the LI service provider entity via the X2 interface and provides the switch with information about where to send intercepted packets. The controller is located in the GSN.

The switch 9 comprises a number of input ports and a number of output ports. It is placed in connection with the controller and receives instructions from the controller about what packets should be offloaded from the GSN and which packets to intercept. The switch is connected to the LI service provider via the X3 interface where it sends Contents of Communication, CC, i.e. the contents of the intercepted packets. Packets that are not to be intercepted but offloaded are forwarded to ports in the switch. There are several actions that may be performed in the switch with the packets other than LI. Such actions are for example forward packets to port(s), encapsulate and forward packets to controller, drop packet and send to normal processing pipeline.

The GSN is configured to receive requests for lawful interception, LI, activation through the X1_1 interface from the ADMF of the lawful interception service provider entity 1. Each request comprises a target identity. The target identity is the identity of the target device to be lawfully intercepted and is for example the targets Tunnel endpoint identifier, TEID, international mobile subscriber identity, IMSI, or international mobile station equipments identity, IMEI. Upon reception of a LI activation request, the controller sends an acknowledge of the request for LI activation back to the lawful interception service provider entity. In this exemplary embodiment the acknowledgement is sent to the DF2 entity via the X2 interface. Upon reception of a LI activation request, the controller further sends a lawful interception activation request comprising the target identity to the switch; thereby instructing the switch to duplicate packets targeting the target and forwarding the duplicated packets to the lawful interception service provider entity. The TEID is used in the switch to identify which packets belong to the target to be intercepted. In this exemplary embodiment the duplicated packets are sent from the switch directly to DF3, via the X3 interface, which sends them via the HI3 interface to the LEA. The IMSI (or IMEI) is used by DF3 to identify which target the packets are from. The controller offloads the GSN so that all packets addressing the target go through the switch and not the GSN.

In FIG. 3c the extension to the openflow protocol 5 in an openflow switch 4, 9 according to an exemplary embodiment of the present disclosure is illustrated. Packets go IN to the switch from the left and OUT to the right. In this exemplary embodiment a flow table n for providing GTP-U offloading and lawful interception is provided in the switch. When the flow table for GTP-U offloading and LI is present in the switch, and LI is enabled for a particular target, the controller is offloaded and the switch handles the packets according to the rules in the flow table, until further instructions are received from the controller.

In FIG. 3d the extension to the openflow protocol 5 in an openflow switch 4, 9 according to a further exemplary embodiment of the present disclosure is illustrated. In this exemplary embodiment one flow table n for providing GTP-U offloading and one flow table n+1 for providing lawful interception are provided. According to one embodiment of the present disclosure, the switch provides only for LI offloading. Hence, the proposed technique is not dependent on the implementation of GTP-U offloading, but may be combined with it.

Figure 4:
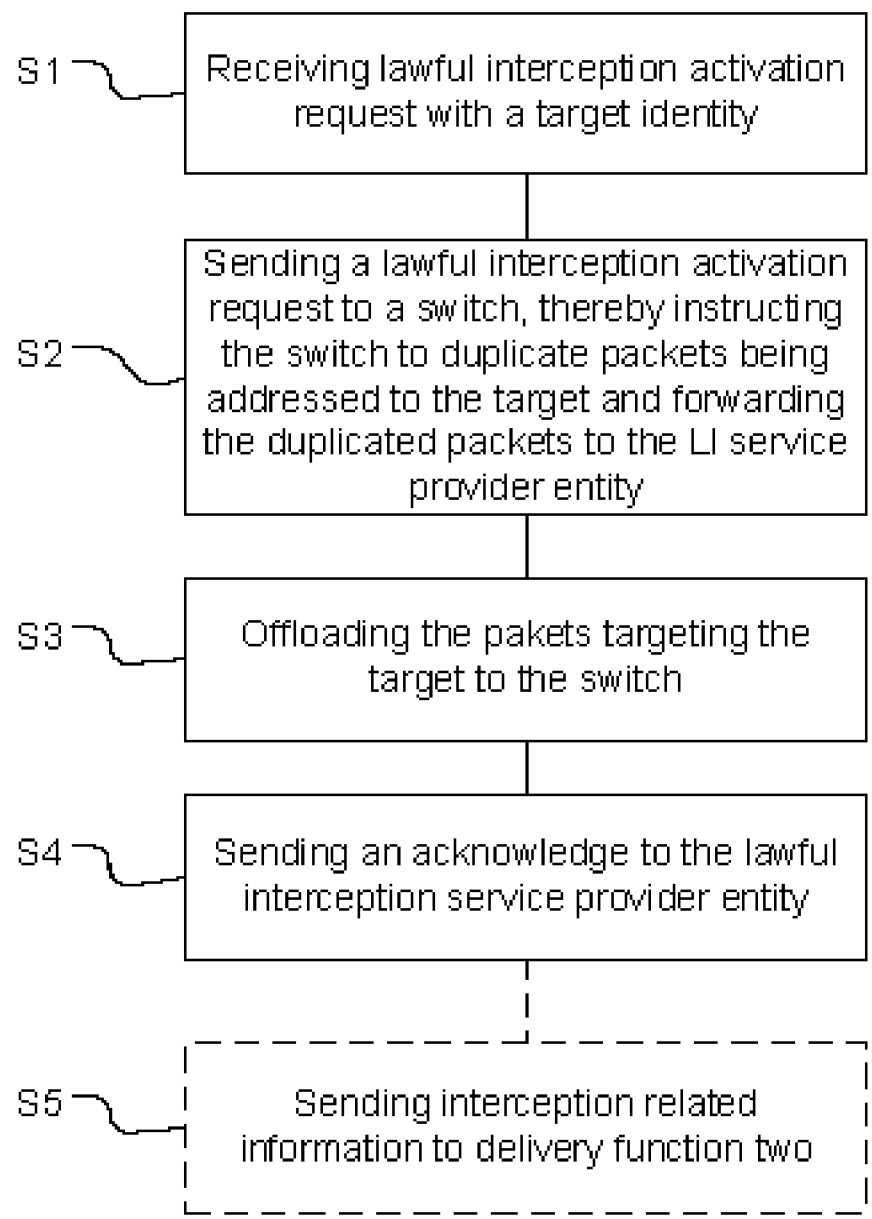
FIG. 4 is a flow chart illustrating a method performed by a gateway according to an exemplary embodiment of the present disclosure.

In FIG. 4 the method performed in a gateway of activating lawful interception is summarized as a flow chart. The gateway comprises a controller for controlling, using a flow control protocol, the flow of packets through a switch controlled by the gateway. In the first step S1 the gateway receives, from a lawful interception service provider entity 1, an instruction on lawful interception activation, comprising a target identity. The target identity is the identity of a subscriber of a communications service whose communications has been lawfully authorized to be intercepted and delivered to a LEA. The target identity is provided to the lawful interception service provider entity by the LEA.

In the second step S2 the controller of the gateway sends to the switch, a lawful interception activation request, comprising the target identity; thereby instructing the switch to duplicate packets being addressed to the target and forward the duplicates to the lawful interception service provider entity 1. The switch is thus instructed to perform lawful interception on the target.

In the third step S3 the gateway offloads at least all packets targeting said target, by redirecting, that is offloading, them to the switch. Offloading means that all intercepted traffic is now redirected such that it does not pass through the gateway. I.e. packets arrive at the switch and the switch duplicates them and forwards them to the LI service provider entity 1 directly, without involvement of the gateway, based on the information the switch has received from the gateway. Lawful interception is then offloaded from the gateway and performed in the switch.

In the fourth step S4 the gateway sends an acknowledge to the lawful interception service provider entity 1 so that it is confirmed that lawful interception has been activated according to the instructions from the lawful interception service provider entity.

The result of this method is that all intercepted packets are redirected to the switch, where they are duplicated. The switch then sends the original packet further to its target, as would normally be done by the GSN. Interception is handled by the switch and duplicates of the intercepted packets are sent directly from the switch to the LEA via the X3 interface from the switch to DF3 in the LI service provider entity and the HI3 interface from DF3 to the LEA.

According to one embodiment of the present disclosure the lawful interception service provider entity 1 comprises an administration function ADMF, a delivery function two DF2 and a delivery function three DF3, as disclosed in FIG. 1a. It should be noted that the lawful interception service provider entity may be constructed in several different ways. For example, the DF2 and the DF3 may together form one mediation device. In some lawful interception service provider entities the DF2 is named IRI Mediation Function and the DF3 is named CC Mediation Function but they provide the same function as the DF2 and DF3.

According to one embodiment of the present disclosure the method shown in the flow chart of FIG. 4 further comprises a fifth step S5 of: the gateway sending interception related information to delivery function two DF2. Interception related information (IRI) is information related to, for example, Mobile Entity Attach, Mobile Entity Detach, Tracking Area Update, Bearer activation (valid for both Default and Dedicated bearer), Start of Intercept with bearer active, Start of Interception with E-UTRAN attached UE, Bearer Modification, Bearer Deactivation, Serving Evolved Packet System (applicable to the HSS), UE requested PDN connectivity, UE requested PDN disconnection, and/or UE requested bearer resource modification.

According to one embodiment of the present disclosure, the gateway is located in a core network in a cellular communication system. However, it must be appreciated that the method may also be implemented in other packet switched networks, such as 3GPP2 based CDMA 1× and EVDO packet switched network, where lawful interception is requested.

Figure 5:
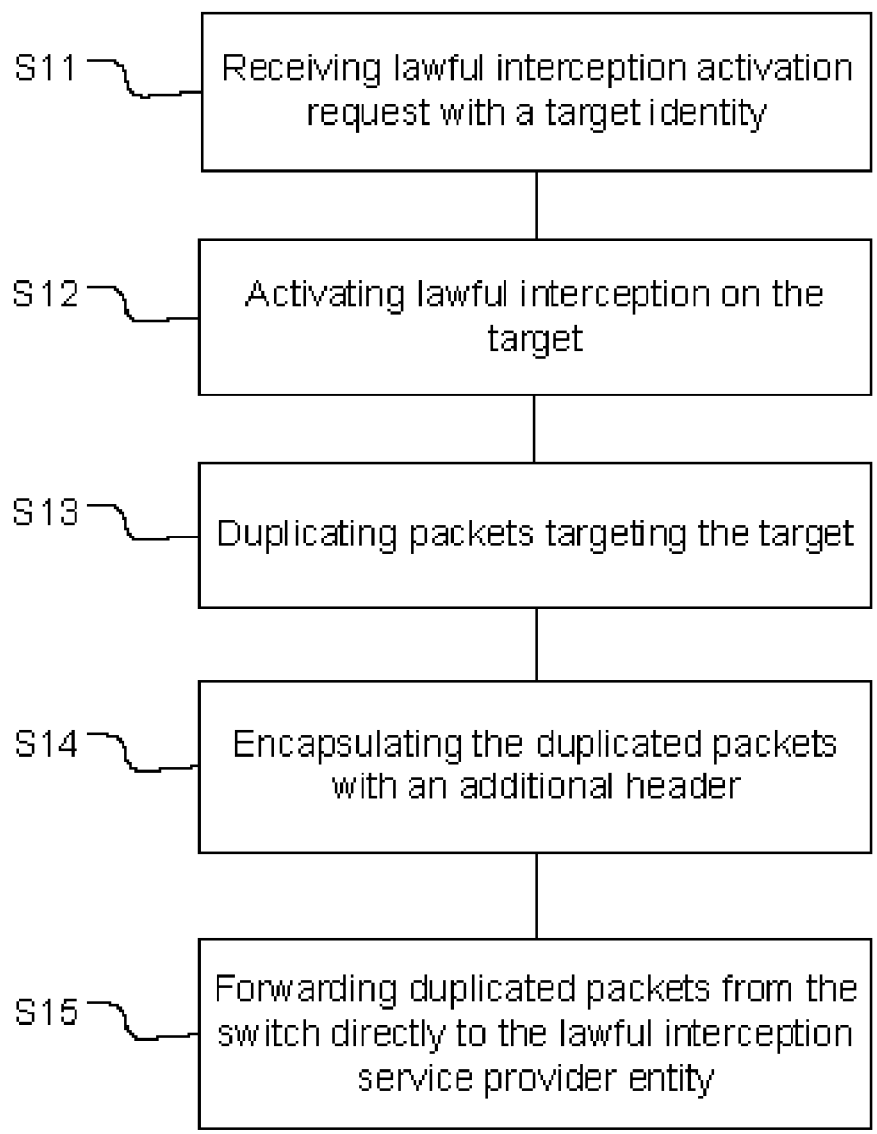
FIG. 5 is a flow chart illustrating a method performed by a switch according to an exemplary embodiment of the present disclosure.

In FIG. 5 the method performed in a switch for activating lawful interception is disclosed. The switch is controlled by the controller for controlling the flow of packets through said switch using a flow control protocol. In the first step S11 the switch receives, from the controller, a lawful interception activation request, comprising a target identity. The switch has then been instructed to perform lawful interception on a target chosen by the LEA.

In the second step S12 the switch activates, in response to said request, lawful interception on a target identified by the target identity. This implies e.g. updating the rules applied to a target in a flow table. In the third to fifth step S13-S15 the switch duplicates packets targeting the target, encapsulates the duplicated packets with an additional header and forwards duplicates from the switch directly to the lawful interception service provider entity 1 for further distribution to a Lawful interception Agency. These steps are performed repeatedly until Lawful interception is deactivated. By using the switch for duplicating packets and sending them directly from the switch to the LI service provider entity the gateway is offloaded from handling the packets to be lawfully intercepted.

Figure 6:
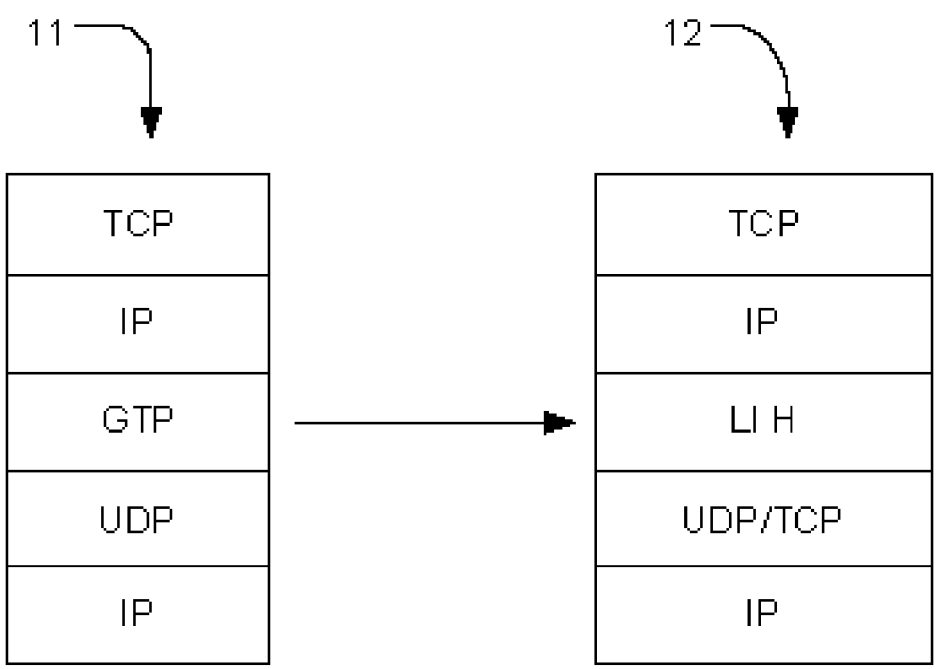
FIG. 6 illustrates the difference between a packet and a duplicated packet.

FIG. 6 illustrates an example of the difference between an original packet 11 and a duplicated packet 12. In the duplicated packet the DF3 IP and port number are included in the UDP/TCP and IP field and the GTP field is replaced by a LI header LI H. The IMSI or IMEI is for example included in the LI header so that the DF3 will know what target the duplicated packet comes from.

According to one embodiment of the present disclosure the flow control protocol is extended to comprise lawful interception information. Lawful interception related information is for example address for where to send duplicated packets in the lawful interception service provider entity 1. Lawful interception related information is for example a flow table modification request.

According to one embodiment of the present disclosure the lawful interception service provider entity 1 comprises an administration function ADMF, a delivery function two DF2 and a delivery function three DF3, and wherein the duplicated packets are forwarded to delivery function three DF3. Again, the parts of the lawful interception service provider entity are shown in FIG. 1a as discussed above. The duplicated packets are sent to DF3 because the DF3 handles the CC in the lawful interception service provider entity. The packets are sent via the X3 interface from the switch to DF3.

According to one embodiment of the present disclosure the additional header comprises the delivery function three DF3 port number and IP address so that the switch sends the duplicated packets directly to DF3 of the lawful interception service provider entity 1.

According to one embodiment of the present disclosure the lawful interception activation request further comprises the delivery function three DF3 port number and IP address so that the switch can send the duplicated packets directly to DF3. The duplicated packets do not go back to the gateway and the gateway is thus offloaded from handling packets targeted for lawful interception.

According to one embodiment of the present disclosure, the lawful interception activation request sent from the controller to the switch comprises at least one of the following: the DF3 IP address and port, the Tunnel endpoint identifier, TEID, the target entity (IMSI, IMEI and/or MSISDN), correlation number and/or downlink or uplink information.

According to one embodiment of the present disclosure, the controller does not send the lawful interception activation request to the switch if the target for the LI is not attached to the network. The controller adds, removes or modifies the bearer flow in the switch based on session management scenarios in the gateway.

According to one embodiment of the present disclosure the flow control protocol further comprises a message indicating that the node supports lawful interception. This is so that all devices interacting via the flow control protocol will know that lawful interception is supported and what flow table modifications are available.

According to one embodiment of the present disclosure, the switch is an openflow switch where the flow control protocol is openflow 5. The controller originates flow table modification requests on specific bearers and sends it to the openflow switch. When using the openflow protocol between the gateway and the switch, an extension to the openflow protocol is needed for enabling lawful interception offloading. The extension of the openflow protocol is for example a new variable that may be set to indicate if the openflow switch supports lawful interception or not. The extension is for example introducing a new action which encapsulates duplicated packets with an additional header and forwarding it to DF3.

According to one embodiment of the present disclosure, the openflow switch sends a message to the controller indicating the capabilities supported by the switch. As an example, a bit is set in the capability message which indicates if the switch supports LI or not. The message for example looks like the following:

```
enum ofp_capabilities {
OFPC_FLOW_STATS = 1 << 0, /* Flow statistics. */
OFPC_TABLE_STATS = 1 << 1, /* Table statistics. */
OFPC_PORT_STATS = 1 << 2, /* Port statistics. */
OFPC_GROUP_STATS = 1 << 3, /* Group statistics. */
OFPC_IP_REASM = 1 << 5, /* Can reassemble IP fragments. */
OFPC_QUEUE_STATS = 1 << 6, /* Queue statistics. */
OFPC_ARP_MATCH_IP = 1 << 7, /* Match IP addresses in ARP pkts. */
OFPC_GTPU_OFFLOAD=1<<8, /* GTPU offload feature */
OFPC_LI_FORWARD=1<<9/* GTPU lawful interception offload*/
};
```

The action type OFPC_LI_FORWARD is introduced which is the action that encapsulates the duplicated packets with an additional header and forwards it to the DF3 node. The following is an example of an extension to the openflow protocol to which includes OFPC_LI_FORWARD:

```
enum ofp_action_type {
    OFPAT_OUTPUT, /* Output to switch port. */
    OFPAT_SET_VLAN_VID, /* Set the 802.1q VLAN id. */
    OFPAT_SET_VLAN_PCP, /* Set the 802.1q priority. */
    OFPAT_SET_DL_SRC, /* Ethernet source address. */
    OFPAT_SET_DL_DST, /* Ethernet destination address. */
    OFPAT_SET_NW_SRC, /* IP source address. */
    OFPAT_SET_NW_DST, /* IP destination address. */
    OFPAT_SET_NW_TOS, /* IP ToS (DSCP field, 6 bits). */
    OFPAT_SET_NW_ECN, /* IP ECN (2 bits). */
    OFPAT_SET_TP_SRC, /* TCP/UDP/SCTP source port. */
    OFPAT_SET_TP_DST, /* TCP/UDP/SCTP destination port. */
    OFPAT_COPY_TTL_OUT, /* Copy TTL "outwards" -- from
    next-to-outermost to outermost */
    OFPAT_COPY_TTL_IN, /* Copy TTL "inwards" -- from
    outermost to next-to-outermost */
    OFPAT_SET_MPLS_LABEL, /* MPLS label */
    OFPAT_SET_MPLS_TC, /* MPLS TC */
    OFPAT_SET_MPLS_TTL, /* MPLS TTL */
    OFPAT_DEC_MPLS_TTL, /* Decrement MPLS TTL */
    OFPAT_PUSH_VLAN, /* Push a new VLAN tag */
    OFPAT_POP_VLAN, /* Pop the outer VLAN tag */
    OFPAT_PUSH_MPLS, /* Push a new MPLS tag */
    OFPAT_POP_MPLS, /* Pop the outer MPLS tag */
    OFPAT_SET_QUEUE, /* Set queue id when outputting to a port */
    OFPAT_GROUP, /* Apply group. */
    OFPAT_SET_NW_TTL, /* IP TTL. */
    OFPAT_DEC_NW_TTL, /* Decrement IP TTL. */
    OFPAT_GTPU_PUSH,
    OFPAT_GTPU_POP,
    OFPAT_GTPU_REPLACE,
    OFPAT_LI_FORWARD,
    OFPAT_EXPERIMENTER = 0xffff
    };
Action structure for OFPAT_LI_FORWARD:
    struct ofp_action_li_forward {
            uint16_t type;
        uint16_t length;
        uint8_t identity_type;
        uint8_t identity_len;
        uint8_t identity[64] ;
        uint64_t correlation_number ;
```

```
        uint32_t time_stamp ; /*optional*/
        uint8_t direction ; /* MO or MT, optional */
        uint32_t location ; /* target location, optional */
    };
```

Flow match field is the match field structure which is used in the flow entry of the flow table. The match field in the flow table is used to match against packets, i.e. the structure indicates how to match a flow entry in the flow table. The field generally consists of the ingress port, packet headers and/or metadata specified by a previous table. Which fields to match is decided by the flow table. For example, nw_dst indicates the destination IP address, tp_dst indicates the destination port number and the added TEID is used to identify the bearer.

According to one aspect of the present disclosure, new match type and match fields are introduced on the flow. The match type indicates the match structure in use. The match type is placed in the type field at the beginning of all match structures.

```
        Enum ofp_match_type {
        OFPMT_STANDARD,
        OFPMT_GTPU,
        OFPMT_LI
        };
```

The match field structure is extended to support LI offloading. GTP-U type in the GTP-U header and TEID is used to identify the flow. The pad is used to align 8 bytes.

```
/* Fields to match against flows */
struct ofp_match {
uint16_t type; /* One of OFPMT_* */
uint16_t length; /* Length of ofp_match */
uint32_t in_port; /* Input switch port. */
uint32_t wildcards; /* Wildcard fields. */
uint8_t dl_src[OFP_ETH_ALEN]; /* Ethernet source address. */
uint8_t dl_src_mask[OFP_ETH_ALEN]; /* Ethernet source address
mask. */
uint8_t dl_dst[OFP_ETH_ALEN]; /* Ethernet destination address. */
uint8_t dl_dst_mask[OFP_ETH_ALEN]; /* Ethernet destination
address mask. */
uint16_t dl_vlan; /* Input VLAN id. */
uint8_t dl_vlan_pcp; /* Input VLAN priority. */
uint8_t pad1[1]; /* Align to 32-bits */
uint16_t dl_type; /* Ethernet frame type. */
uint8_t nw_tos; /* IP ToS (actually DSCP field, 6 bits). */
uint8_t nw_proto; /* IP protocol or lower 8 bits of
* ARP opcode. */
uint32_t nw_src; /* IP source address. */
uint32_t nw_src_mask; /* IP source address mask. */
uint32_t nw_dst; /* IP destination address. */
uint32_t nw_dst_mask; /* IP destination address mask. */
uint16_t tp_src; /* TCP/UDP/SCTP source port. */
uint16_t tp_dst; /* TCP/UDP/SCTP destination port. */
uint32_t mpls_label; /* MPLS label. */
uint8_t mpls_tc; /* MPLS TC. */
uint8_t gtpu_type; /* gtp_u message type */
uint8_t pad2[2] ; /* align to 64 bits */
uint32_t teid ;           /* tunnel id*/
uint8_t pad3[4] ;         /* align to 64 bits */
uint64_t metadata; /* Metadata passed between tables. */
uint64_t metadata_mask; /* Mask for metadata. */
};
OFP_ASSERT(sizeof(struct ofp_match) ==
OFPMT_STANDARD_LENGTH + 8);
```

According to one embodiment of the present disclosure the flow control protocol is any flow control protocol with the purpose of offloading the GSN.

According to one embodiment of the present disclosure, the lawful interception activation request comprises a flow table modification request on the targeted port. When using the openflow protocol, the flow tables control how to handle packets flowing through the switch. Therefore, the lawful interception activation request includes a flow table modification request. The flow table enabling Lawful interception in the switch is then modified so that a lawful interception action enabled on the target is included in the request. See FIG. 3d with LI flow table n+1. This implies that are LI actions are performed on targeted packets set in the flow table in the switch. Hence, the steps of duplicating packets targeting the target, encapsulating the duplicated packets with an additional header and forwarding duplicates from the switch directly to the lawful interception service provider entity 1 are performed on targeted packets set in the flow table in the switch.

According to one embodiment of the present disclosure, the switch is located in connection with a gateway in the core network and wherein the switch is used to offload the forwarding function in the gateway. I.e. the gateway instructs the switch to handle the forwarding function.

According to one embodiment of the present disclosure, the gateway is a Serving Gateway, SGW, a Packet Data Network Gateway, PGW, a Serving GPRS Support Node, SGSN, a Gateway GPRS Support Node, GGSN, a Packet Data Serving Node, PDSN or a Broadband Remote Access Server, BRAS.

Figure 7:
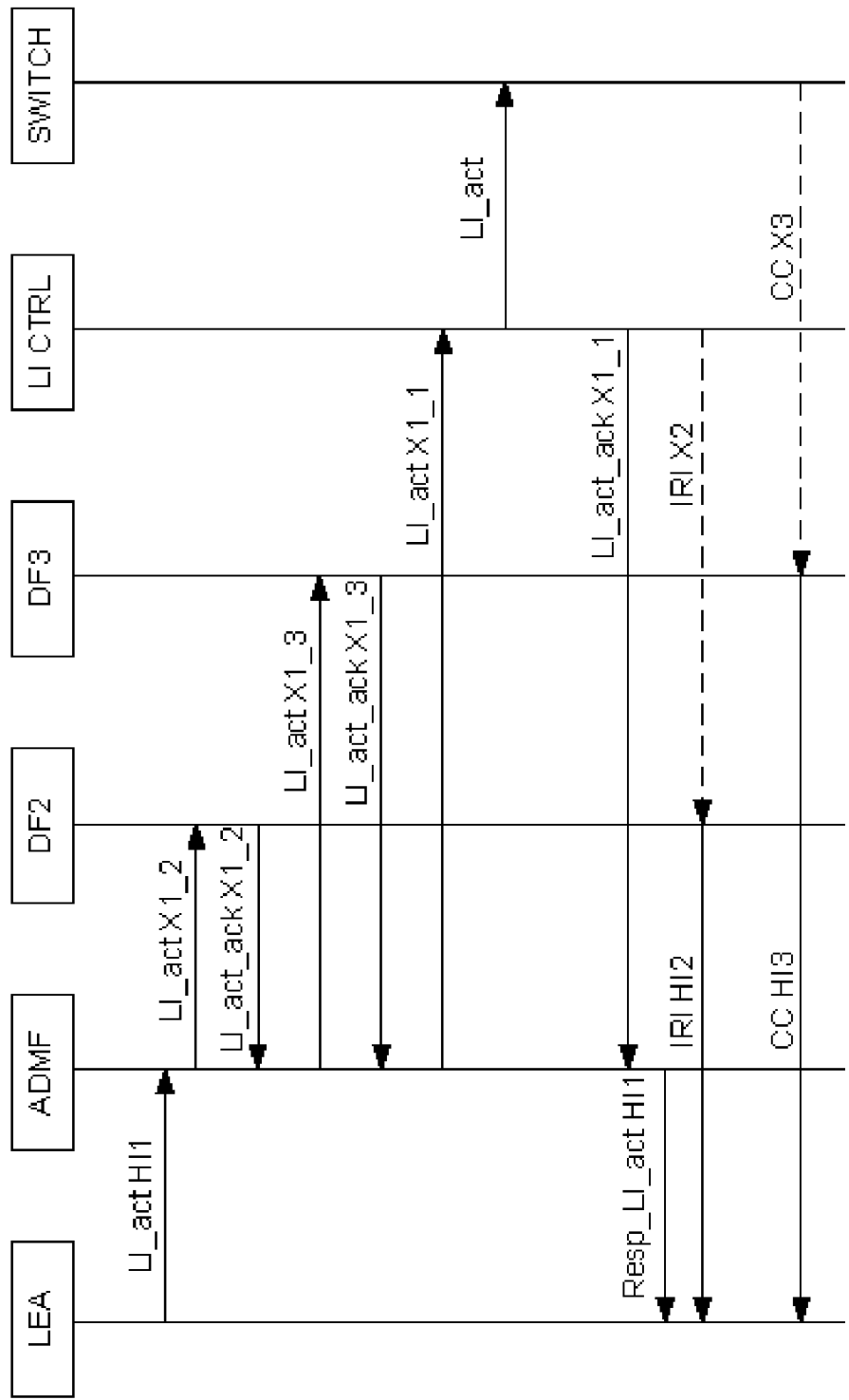
FIG. 7 illustrates a signaling chart for the lawful interception activation procedure according to an exemplary embodiment of the present disclosure.

FIG. 7 is a signaling diagram for providing the lawful interception activation procedure according to an exemplary embodiment of the present disclosure, using the proposed modification of the Openflow protocol as described above. A Law Enforcement Agency LEA sends a request for lawful interception activation LI_act with a target identity through a Law Enforcement Monitoring Facility LEMF to the Administration Function ADMF via the HI1 interface. The ADMF sends instructions to activate lawful interception LI_act to the Delivery Function two DF2 via the X1_2 interface, to the Delivery Function three DF3 via the X1_3 interface and to a controller in the gateway via the X1_1 interface. DF2, DF3 and the controller sends an acknowledge message LI_act_ack back to the ADMF through the same interfaces. Furthermore, the ADMF acknowledges the request Resp_LI_act to the LEA via the HI1 interface. The controller sends a lawful interception activation request LI_act, comprising the target identity, to a switch; thereby instructing the switch to duplicate packets being addressed to the target and forward the duplicates to the lawful interception service provider entity 1. The controller sends the Intercept Related Information IRI to DF2 via the X2 interface. The switch sends the Content of Communications CC, i.e. the duplicated packets, to DF3 via the X3 interface. DF2 sends the IRI via the HI2 interface to the LEA. DF3 sends the CC via the HI3 interface to the LEA.

According to one embodiment of the present disclosure, the lawful interception activation request is implemented in the flow table modification request OFPT_FLOW_MOD which includes the new action LI_FORWARD with the DF3 IP address and port, the TEID in the match fields, the target entity (IMSI or MSISDN), correlation number and/or other necessary LI forwarding information, such as uplink or downlink.

Figure 8:
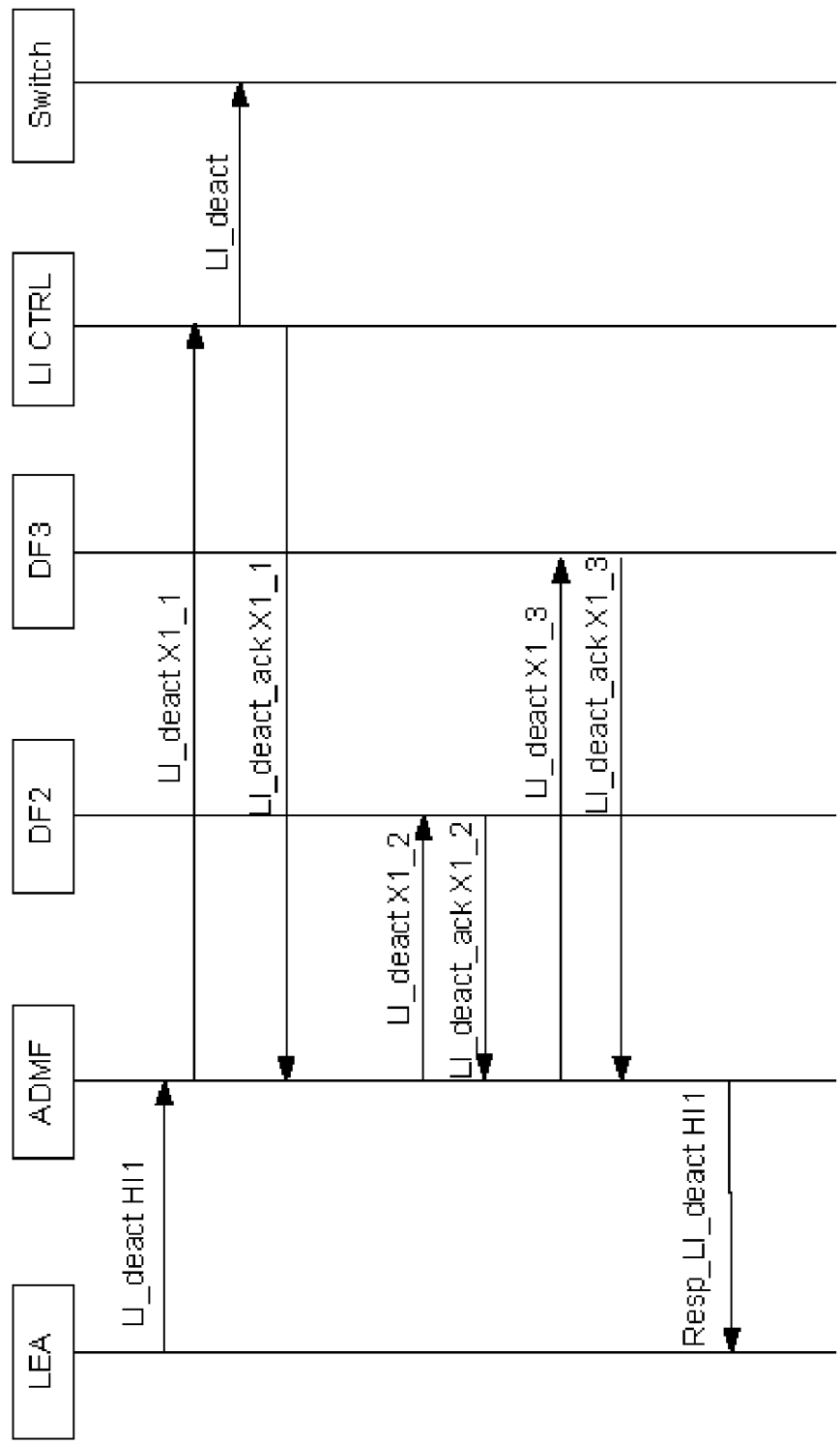
FIG. 8 illustrates a signaling chart for the lawful interception deactivation procedure according to an exemplary embodiment of the present disclosure.

FIG. 8 is a signaling diagram for providing lawful interception deactivation procedure on a target according to an exemplary embodiment of the present disclosure. The LEA sends a request to deactivate LI LI_deact to ADMF via the HI1 interface. The ADMF sends a LI deactivation request LI_deact to DF2, DF3 and the controller via the X1_1, X1_2 and X1_3 interfaces respectively and the DF2, DF3 and controller sends an acknowledge LI_deact_ack via the same interfaces. The controller sends a LI deactivation request LI_deact to the Switch. The ADMF sends a response to the LEA that LI is deactivated Resp_Li_deact via the HI1 interface.

According to an exemplary embodiment of the present disclosure, the switch is an openflow enabled switch. The controller then originates a flow table modification request, OFPT_FLOW_MOD, on specific bearers to remove the LI on a target and sends it to the openflow switch when deactivation has been requested. I.e. the OFPT_FLOW_MOD message includes instructions to remove the LI_FORWARD action in the flow or to remove the bearer flow entry in the LI flow table in the switch.

Figure 9:
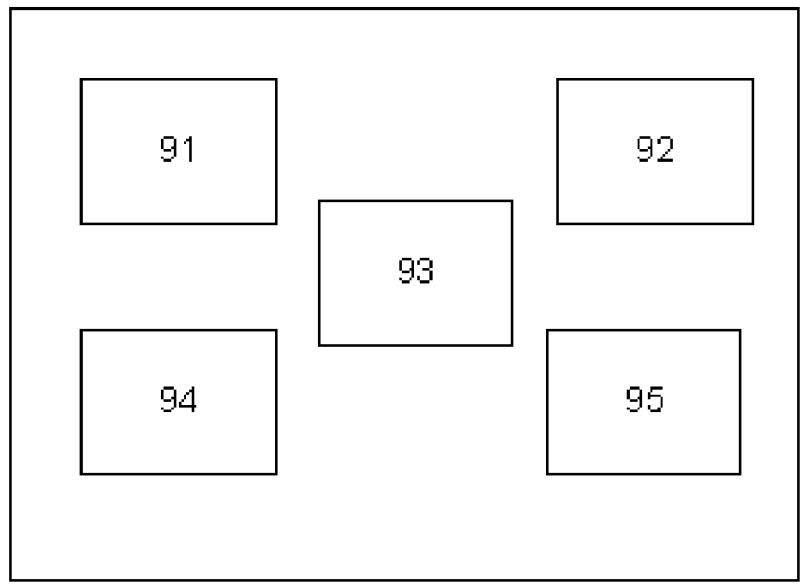
FIG. 9 illustrates a block diagram of the switch according to an exemplary embodiment of the present disclosure.

FIG. 9 is a block diagram of the switch according to an embodiment of the present disclosure. The switch, implemented using a flow control protocol for controlling the forwarding of packets through said switch by a controller, comprises: a receiver 91, an activator 92, a duplicator 93, an encapsulator 94 and a transmitter 95. The receiver 91 is arranged to receive, from the controller, a lawful interception activation request which comprises a target identity. The activator 92 is arranged to activate, in response to said request, lawful interception on a target identified by the target identity. The duplicator 93 is arranged to duplicate packets targeting the target. The encapsulator 94 is arranged to encapsulate the duplicated packets with an additional header. The transmitter 95 is arranged to forward duplicated packets from the switch directly to the lawful interception service provider entity 1 for further distribution to a Lawful interception Agency.

Figure 10:
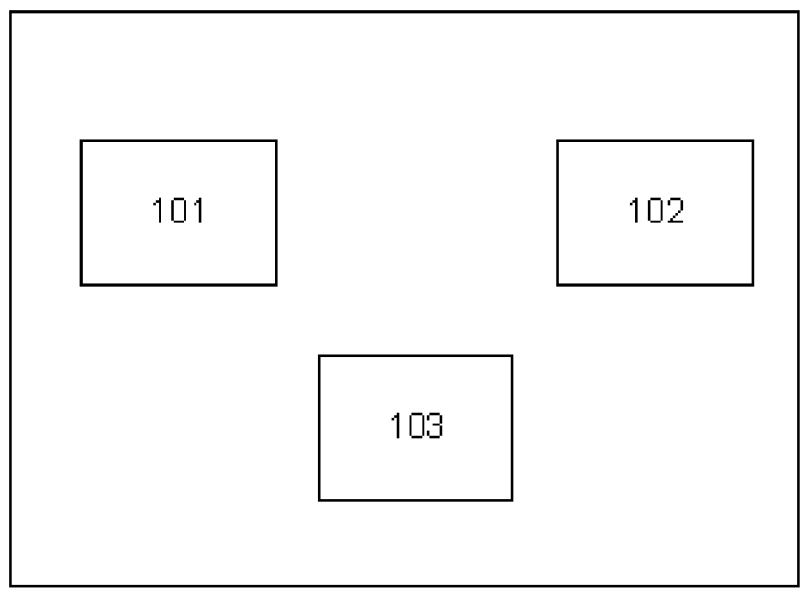
FIG. 10 illustrates a block diagram of the gateway according to an exemplary embodiment of the present disclosure.

FIG. 10 is a block diagram of the gateway configured to control, using a flow control protocol, the forwarding of packets through a switch, according to an embodiment of the present disclosure. The gateway comprises: a network communication unit 101, a processor 102, and a memory 103. The processor that may be constituted by any suitable Central Processing Unit, CPU, microcontroller, Digital Signal Processor, DSP, etc., capable of executing computer program code. A computer program is stored in the memory. The memory can be any combination of a Read And write Memory, RAM, and a Read Only Memory, ROM. The memory may also comprise persistent storage, which, for example, can be any single one or combination of magnetic memory, optical memory, or solid state memory or even remotely mounted memory. The network communication unit or a communication interface is arranged for wireless communication with other devices or nodes.

When the above-mentioned computer program code is run in the processor 102, it causes the gateway to:
  receive, using the network communication, from a lawful interception service provider entity 1, an instruction on lawful interception activation, comprising a target identity;
  send to the switch using the network communication, a lawful interception activation request of the flow control protocol, comprising the target identity; thereby instructing a switch to duplicate packets being addressed to the target and forward the duplicates to the lawful interception service provider entity;
  offload at least all packets targeting said target, by redirecting, or offloading, them to the switch and
  send, using the network communication, an acknowledge to the lawful interception service provider entity.

The steps, functions, procedures and/or blocks described above may as an alternative be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor, DSP, and/or any suitable programmable logic device such as a Field Programmable Gate Array, FPGA, device and a Programmable Logic Controller, PLC, device.

According to one embodiment of the present disclosure, it provides for a computer program, comprising computer readable code which, when run on a node, causes the node to perform the method according to above.

As used herein, a switch is a piece of networking equipment, including hardware and software, that communicatively interconnects other equipment on the network (e.g., other network elements, end stations, etc.).

The present disclosure is not limited to the specific flowchart presented, but includes all variations within the scope of the present claims.

As will be realized, the present disclosure is capable of modification in various obvious respects, all without departing from the scope of the appended claims. Accordingly, the drawings and the description thereto are to be regarded as illustrative in nature, and not restrictive.

The invention claimed is:

1. A method, executed in a gateway, of activating lawful interception, wherein said gateway comprises a controller for controlling, using a flow control protocol, the flow of packets through an external switch controlled by the gateway, wherein the external switch is external to the gateway, the method comprising:
  the gateway receiving an instruction on lawful interception activation transmitted by a lawful interception service provider (LISP) entity, wherein the instruction comprises target information identifying a target;
  after receiving the instruction, the gateway sending, via a network link, to the external switch a lawful interception activation request comprising the target information, wherein the external switch is configured to duplicate packets addressed to the target and forward the duplicated packets to the LISP entity such that the gateway is offloaded from handling packets to be lawfully intercepted;
  the gateway redirecting to the external switch all packets targeting said target; and
  the gateway sending an acknowledge to the LISP entity.

2. The method of claim 1, wherein the flow control protocol is extended to comprise lawful interception information.

3. The method of claim 1, wherein the LISP entity comprises an administration function (ADMF), a delivery function two and a delivery function three.

4. The method of claim 1, wherein the method further comprises the step of:
  the gateway sending interception related information to delivery function two.

5. The method of claim 3, wherein the lawful interception activation request further comprises the delivery function three port number and IP address.

6. The method of claim 1, wherein the flow control protocol is openflow.

7. The method of claim 6, wherein the lawful interception activation request comprises a flow table modification request.

8. The method of claim 1, wherein the gateway is located in a core network in a cellular communication system.

9. The method of claim 1, wherein the gateway is a Serving Gateway, SGW, a Packet Data Network Gateway, PGW, a Serving GPRS Support Node, SGSN, a Gateway GPRS Support Node, GGSN, a Packet Data Serving Node, PDSN or a Broadband Remote Access Server, BRAS.

10. A method, in an external switch, of providing lawful interception, wherein said external switch is controlled by a gateway comprising a controller for controlling the flow of packets through said external switch using a flow control protocol, wherein the external switch is external to the gateway, the method comprising the steps of:
the external switch receiving a lawful interception activation request transmitted by the gateway, wherein the lawful interception activation request comprises target information identifying a target;
the external switch activating lawful interception on a target identified by the target identity in response to the lawful interception activation request;
the external switch receiving packets addressed to the target;
the external switch duplicating the packets addressed to the target;
the external switch encapsulating the duplicated packets with an additional header; and
the external switch forwarding the duplicated packets directly to a lawful interception service provider (LISP) entity for further distribution to a Lawful interception Agency.

11. The method of claim 10, wherein the flow control protocol is extended to comprise lawful interception information.

12. The method of claim 10, wherein the LISP entity comprises an administration function, a delivery function two and a delivery function three, and wherein the duplicated packets are forwarded to delivery function three.

13. The method of claim 12, wherein the additional header comprises the delivery function three port number and IP address.

14. The method of claim 12, wherein the lawful interception activation request further comprises the delivery function three port number.

15. The method of claim 10, wherein the flow control protocol further comprises a message indicating that a node supports lawful interception.

16. The method of claim 10, wherein the external switch is an openflow external switch and the flow control protocol is openflow.

17. The method of claim 16, wherein the lawful interception activation request comprises a flow table modification request on the targeted port.

18. The method of claim 10, wherein the external switch is located in a core network in a cellular communication system.

19. The method of claim 18, wherein the external switch is located in connection with a gateway in the core network and wherein the external switch is used to offload the forwarding function in the gateway.

20. The method of claim 19, wherein the gateway is a Serving Gateway, SGW, a Packet Data Network Gateway, PGW, a Serving GPRS Support Node, SGSN, a Gateway GPRS Support Node, GGSN, a Packet Data Serving Node, PDSN or a Broadband Remote Access Server, BRAS.

21. An external switch, implemented using a flow control protocol for controlling the forwarding of packets through said external switch, wherein the external switch is controlled by a gateway comprising a controller and the external switch is external to the gateway, wherein the external switch comprises:
a receiver;
a transmitter;
memory; and
a processor coupled to the receiver, transmitter, and memory, the processor configured to:
employ the receiver to receive a lawful interception activation request transmitted by the gateway, wherein the lawful interception activation request comprises target information identifying a target;
activate lawful interception on a target identified by the target identity in response to the lawful interception activation request;
employ the receiver to receive packets addressed to the target;
duplicate the packets addressed to the target;
encapsulate the duplicated packets with an additional header; and
employ the transmitter to forward the duplicated packets directly to a lawful interception service provider (LISP) entity for further distribution to a Lawful interception Agency.

22. A gateway, configured to control, using a flow control protocol, the forwarding of packets through an external switch controlled by the gateway, wherein the external switch is external to the gateway and the gateway comprises:
a network communication unit;
a processor; and
a memory storing computer program code which, when run in the processor, causes the gateway to:
employ the network communication unit to receive an instruction on lawful interception activation transmitted by a lawful interception service provider (LISP) entity, wherein the instruction comprises target information identifying a target;
after receiving the instruction, employ the network communication unit to send to the external switch a lawful interception activation request comprising the target information, wherein the external switch is configured to duplicate packets addressed to the target and forward the duplicated packets to the LISP entity;
redirecting to the external switch all packets targeting said target; and
employing the network communication unit to send an acknowledge to the LISP entity.

23. A computer program product comprising a non-transitory computer readable medium storing instructions that, when run on a gateway comprising a controller for controlling, using a flow control protocol, a flow of packets through an external switch controlled by the gateway, wherein the external switch is external to the gateway, causes the gateway to:
receive an instruction on lawful interception activation transmitted by a lawful interception service provider (LISP) entity, wherein the instruction comprises target information identifying a target;
after receiving the instruction, send to the external switch a lawful interception activation request comprising the target information; wherein the external switch is configured to duplicate packets addressed to the target and forward the duplicated packets to the LISP entity;

redirect to the external switch all packets targeting said target; and send an acknowledge to the LISP entity.

\* \* \* \* \*